(No Model.) 2 Sheets—Sheet 1.
W. A. MACK.
BRAKE OR STOP MECHANISM.
No. 575,965. Patented Jan. 26, 1897.
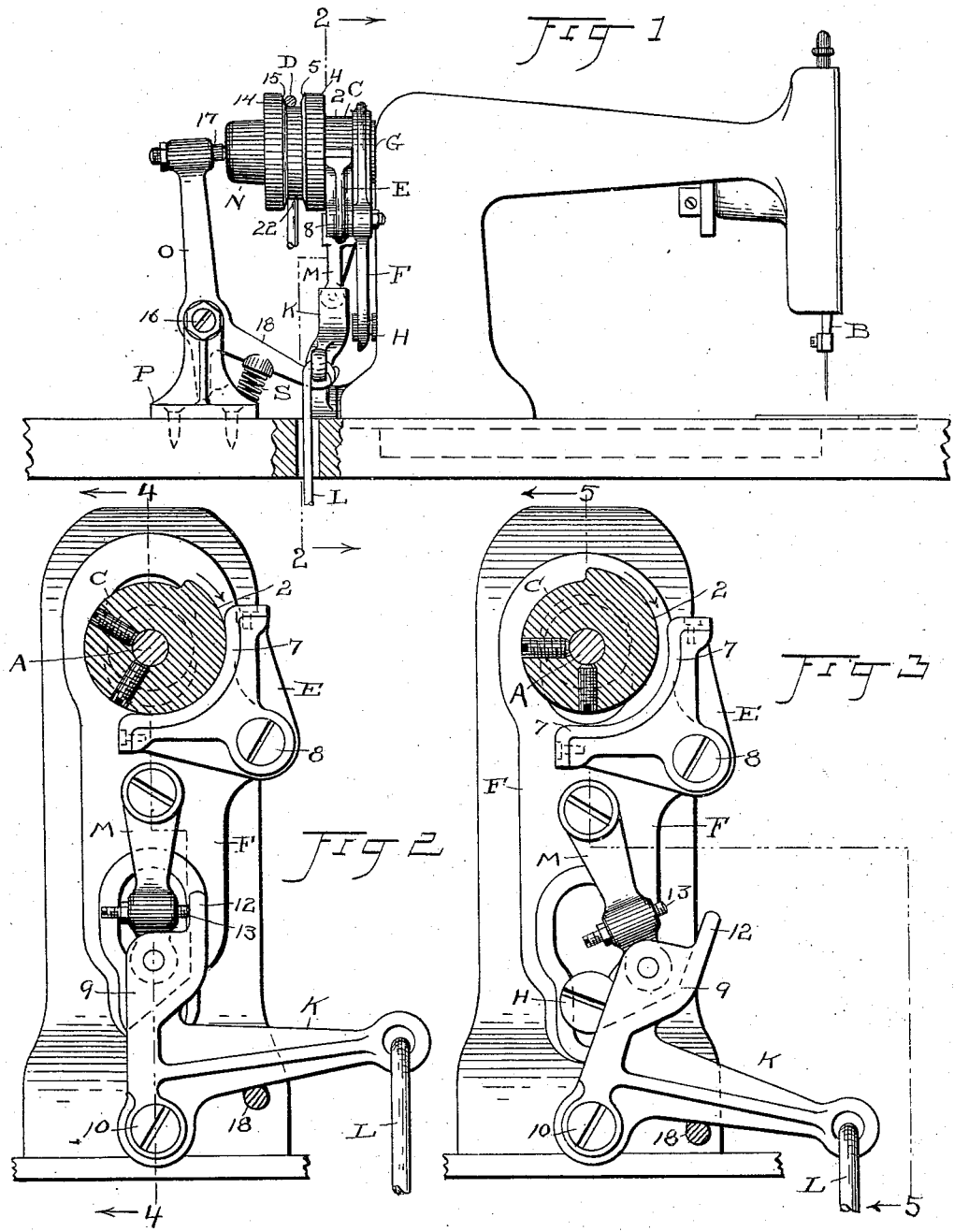
ATTEST
R. B. Moser.
G. S. Schaeffer
INVENTOR
William A. Mack
BY H. J. Fisher ATTORNEY

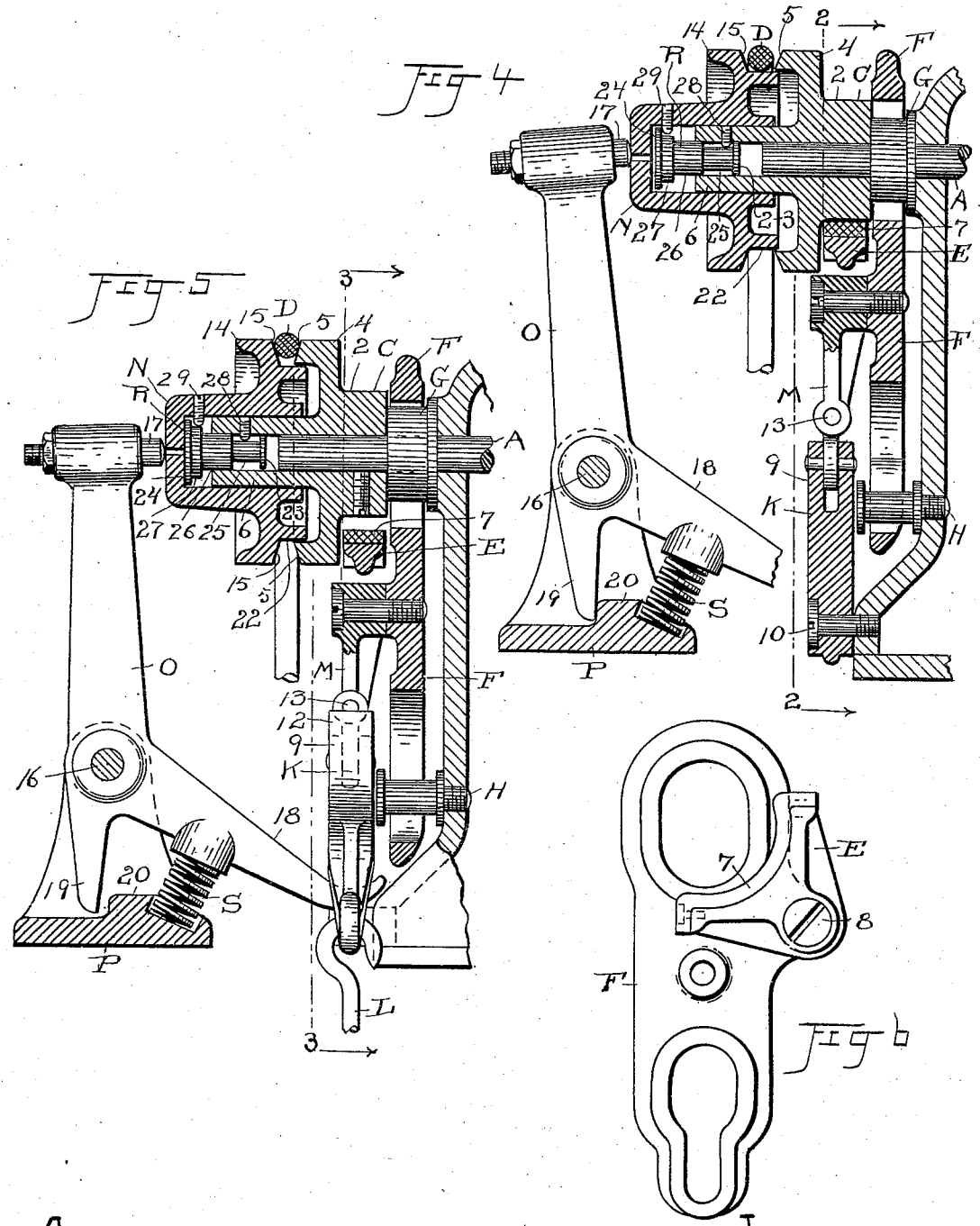

UNITED STATES PATENT OFFICE.

WILLIAM A. MACK, OF CLEVELAND, OHIO, ASSIGNOR TO THE STANDARD SEWING MACHINE COMPANY, OF SAME PLACE.

BRAKE OR STOP MECHANISM.

SPECIFICATION forming part of Letters Patent No. 575,965, dated January 26, 1897.

Application filed October 30, 1893. Serial No. 489,459. (No model.)

*To all whom it may concern:*

Be it known that I, WILLIAM A. MACK, a citizen of the United States, residing at Cleveland, in the county of Cuyahoga and State of Ohio, have invented certain new and useful Improvements in Brake or Stop Mechanism for Sewing-Machines; and I do hereby declare that the following is a full, clear, and exact description of the invention, which will enable others skilled in the art to which it appertains to make and use the same.

My invention relates to brake or stop mechanism for sewing-machines; and the invention consists in the mechanism substantially as shown and described, and particularly pointed out in the claims.

In the accompanying drawings, Figure 1 is a side elevation of a sewing-machine arm and part of the table and of my improved brake and stop mechanism arranged in connection therewith. Fig. 2 is a cross-section of said mechanism on a line corresponding substantially to 2 2, Fig. 1, and showing the brake in operation. Fig. 3 is a view on the same line as Fig. 2, but showing the brake mechanism in the reverse position to Fig. 2 and as it appears when the machine is running. Fig. 4 is a vertical central sectional elevation on a line corresponding to 4 4, Fig. 2, and showing the parts in the same relation as in Fig. 2 and the brake set. Fig. 5 is a view on line 5 5, Fig. 3, and showing the parts as they appear when the machine is in operation, the same as in Fig. 3. Fig. 6 is a detail in elevation of the brake-shoe and its supporting-piece.

A represents the main shaft, through which the needle-bar B is operated. The stop mechanism is connected with the opposite end of the shaft A, and for this purpose I affix a pulley C to said shaft. This pulley has several distinct features of construction which are important in the operation of the mechanism, comprising, first, the cam or eccentric brake-surface 2, (shown most distinctly in Figs. 2 and 3,) a flange 4 at one side of and toward the center of said pulley, having a bearing or engaging surface 5 at its side adapted to form a bearing for the belt D, which drives the machine, and a reduced cylindrical portion 6, which extends out some distance beyond the end of the shaft A. Now it is my purpose through this mechanism to stop the machine practically at the instant when the stop mechanism is applied, and always when the needle is in some fixed position previously determined upon, either up or down, as seen, for example, in Fig. 1, where it is up; but notwithstanding the promptness with which stopping may be effected it is desirable at the same time to cause stopping without a jar or strain upon the machine. The construction of the eccentric or cam 2 and its arrangement upon the shaft A enable me to effect this result in the way desired, especially when employed in connection with a brake constructed substantially as shown in the drawings.

The brake-shoe E has a surface lined with leather or other suitable material 7 to bear on the eccentric, and is pivoted at 8 on a vertical sliding support F. This support may have a slot at its top working over a collar G on the main shaft, as shown, or equivalent construction, and has a slot at its bottom working over a suitable screw H or its equivalent, fixed to the main arm or standard of the frame, Figs. 5 and 6. The supporting piece or plate F is thus guided within vertical lines up and down and serves to bring the brake-shoe into or out of braking position, according as said plate or piece is raised or lowered, as clearly shown in Figs. 2 and 3.

When the brake-shoe is in engaging position, as in Fig. 2, it bears upon the cam 2 and will always lock the shaft and prevent further rotation at substantially the same place, and it is always designed to stop the shaft in some predetermined position, as when the needle is raised, as seen in Fig. 1. To throw the said parts into locking position, I employ a treadle-lever K, having a rod or cord L, which goes down to the treadle, and an arm 9, extending up from its pivot-point 10, which has pivoted engagement with a link M, pivoted above on the part F. This construction gives me practically a toggle-link connection between the lever K and the brake-carrying piece F, and the arm 9 and the link M are so constructed and arranged as to stop when they are in a vertical or substantially vertical position, or at any rate in such position that they will, by reason of their position, throw the brake-shoe into engagement and hold it there. In the present construction the arm 9 has an extension or lip 12 above its pivot connection with link M, and the said link has a screw 13 threaded through it and adjustable to make engagement with the lip 12. In this way the best position for stopping these parts may be ascertained and regulated.

The pulley C, having the cam 2, is adjustable upon the shaft A, so as to give it the proper position thereon with respect to the needle.

Associated with the foregoing mechanism are other parts which have to do more especially with driving the machine, and these consist in the pulley N, which is sleeved and has its bearing upon the reduced sleeve portion 6 of the pulley C, and has a flange 14 with a bearing-surface 15 at one side opposite the bearing-surface 5 of the flange 4 on pulley C, and when the two pulleys and parts are in the relation seen in Fig. 5 the belt D makes friction engagement with the inclined bearing-surfaces 5 and 15 and drives the machine. This relation of the pulleys and parts to drive the machine is effected through another lever O, pivoted at 16 and having its upper extremity bearing against the pulley N through a pin 17 therein, and its lower extremity 18 engaging under the treadle-lever K in front of its pivot-point, as seen in Figs. 1 and 2. The said lever O has a finger 19 below its pivot-point, which contacts with the stop 20 on the base on which said lever is pivoted, so as to prevent the lever from being thrown back farther than need be, and between the said base P and the lower extremity 18 of the said lever I place a spring S, so arranged and constructed as to exert an upward tension. The normal position, therefore, of the lever O is as seen in Fig. 4, in which the machine is stopped by engaging the arm 18 of the lever O with the lever K, as shown. The said lever K is normally held in the position seen in Fig. 2 through the effect of the spring S, and when the treadle and the lever K are depressed the depression occurs against the spring S. Hence when the operator removes his foot from the treadle the spring S immediately asserts itself and throws the operating parts out of operating position and the locking parts into locking position, and both parts are actuated by the same movement of the treadle and by the same exertion of spring S.

On the pulley N beneath the belt D is an idle bearing-surface 22 for the said belt, upon which it rests when not at work. It is carried from this position into operating position, as seen in Figs. 3 and 5, when the treadle is depressed by the operator and the upper arm 17 of the lever O is thrown in thereby, as seen in Fig. 5.

In order that the pulley N shall not slide back farther than necessary, and at the same time be supported upon its bearing in a suitable way, I introduce a spool R, located partly in the said pulley and partly within the cylindrical bearing-surface 6 of the pulley C. This spool has flanges 23 and 24 at its ends and three reduced portions of varying diameters 25, 26, and 27. Then there is a short screw 28 through sleeve 6, extending into the smaller diameter 25, and another screw 29 in pulley N over the larger diameter 27, and these screws engage the flanges 23 and 24 on said spool and limit axial movement of the pulley N, as seen in Fig. 5.

I have now described the several parts as they are shown here. Obviously the most of these parts might be more or less modified in construction and still serve the same purpose. Thus, for example, the cam C, the flange part 4 thereof, and the sleeve extension 6 might be separate parts fixed on the shaft instead of all being in one piece, as here, and other changes could be made without departing from the invention. The words "cam" and "eccentric" are used here as synonymous.

Having thus described my invention, what I claim is—

1. The main shaft and the cam, the pivoted brake-shoe and the slidable support therefor, the lever and the part connecting the lever to the said slidable support, substantially as described.

2. Stop mechanism comprising the main shaft and the cam fixed thereon, the brake-shoe to engage said cam, the supporting-piece carrying the brake-shoe, the treadle-operated lever and the link pivoted to said lever and to said supporting-piece, substantially as described.

3. The main shaft, the adjustable cam on said shaft, the pivoted brake-shoe for the cam having a curved engaging surface, the slidable support for said shoe engaged over the main shaft at its upper end, and the mechanism for operating said shoe, substantially as described.

4. The main shaft, and the rotarily-adjustable cam on said shaft, in combination with the brake for the cam, a support on which the brake is pivoted, and mechanism to operate said brake consisting of a treadle and toggle-link connections, substantially as described.

5. The shaft with the cam thereon, a slidable member and a brake-shoe pivoted on said member for engaging said cam, and mechanism for operating the brake consisting in a treadle-lever and arm rigid with each other, a link pivoted to said arm and to said slidable member at its ends and an adjustable stop at the pivot between said arm and said link, substantially as described.

6. The main shaft and the fixed and the slidable pulleys, respectively, thereon having inclined working sides, in combination with mechanism to brake the rotation of the main shaft when the drive power is relieved, said mechanism consisting in a cam on said shaft, a slidable member, a brake-shoe pivoted on said member, and toggle-link-operating mechanism for said slidable member, substantially as described.

7. The mechanism for tightening and operating the belt, consisting of the shaft and the fixed and the free pulleys, respectively, having an engaging surface for the operating-belt, a pivoted arm to press the free pulley toward the fixed pulley and a spool with differential diameters to hold said pulleys together, substantially as described.

8. The main shaft and the fixed pulley thereon having a hub-sleeve, a free pulley on said hub-sleeve, a spool with differential diameters and pins in said pulleys engaging said spool, and a movable part to bear against said movable pulley, substantially as described.

Witness my hand to the foregoing specification this 14th day of October, 1893.

WILLIAM A. MACK.

Witnesses:
H. T. FISHER,
R. B. MOSER.